(12) United States Patent
Rocha et al.

(10) Patent No.: US 8,994,549 B2
(45) Date of Patent: Mar. 31, 2015

(54) SYSTEM AND METHOD OF FACILITATING OILFIELD OPERATIONS UTILIZING AUDITORY INFORMATION

(75) Inventors: Carlos F. P. Rocha, Icaraí-Niteroi-RJ (BR); Flavio Ivan Da Silva, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 530 days.

(21) Appl. No.: 13/348,036

(22) Filed: Jan. 11, 2012

(65) Prior Publication Data

US 2012/0195166 A1   Aug. 2, 2012

Related U.S. Application Data

(60) Provisional application No. 61/437,037, filed on Jan. 28, 2011.

(51) Int. Cl.
   *G01V 3/00* (2006.01)
   *E21B 47/10* (2012.01)
   *G01V 1/34* (2006.01)

(52) U.S. Cl.
   CPC .............. *E21B 47/101* (2013.01); *G01V 1/345* (2013.01)
   USPC ...................... 340/853.1; 340/853.2; 340/500; 340/690; 340/692; 340/384.1; 367/14; 367/81; 367/86; 175/40; 166/65.1; 166/66

(58) Field of Classification Search
   CPC ........... G01V 1/00; G01V 1/003; G01V 1/28; G01V 1/32; G01V 1/325; G01V 1/34; G01V 1/345; G01V 1/40; G01V 1/44; G01V 1/48; G01V 1/50; G01V 99/00; G01V 2210/70; G01V 2210/74; G06F 17/00; G06F 17/30; G06F 17/30002; G06F 17/30017; G06F 17/30058; G06F 17/30061; G06F 17/30067; G06F 17/3074; G06F 17/30749; G06F 17/30908; G06F 17/30914; G06F 17/30917; G06F 3/01; G06F 3/048; G06F 3/0481; G06F 3/04812; G06F 3/04815; G06F 3/0484; G06F 3/04842; G06F 3/04845; G06F 3/16; G06F 3/165; G06F 3/167
   USPC ........ 340/853.1–856.4, 690, 500, 692, 384.1, 340/384.5, 384.7; 367/14–85, 86; 175/40–50; 166/65.1, 66
   See application file for complete search history.

(56) References Cited

U.S. PATENT DOCUMENTS 3,949,353 A * 4/1976 Waters et al. .................. 367/36
4,210,964 A * 7/1980 Rogers et al. .................. 703/10

(Continued)

OTHER PUBLICATIONS

Barrass, et al., "Responsive Sonification of Well-logs", Proc. of Int. Conf. on Auditory Display, 2000.
Frohlich, et al., "Exploring geo-scientific data in virtual environments", IEEE Proceedings Visualization, Oct. 29, 1999, pp. 169-173.

(Continued)

*Primary Examiner* — Steven Lim
*Assistant Examiner* — Ryan Sherwin
(74) *Attorney, Agent, or Firm* — Alec McGinn; Rodney Warfford

(57) ABSTRACT

The invention provides a system and method for facilitating oilfield operations utilizing auditory data. In one embodiment, the present invention generates one or more auditory mapping structures whereby oilfield data may be mapped to sounds. The present invention provides at least one computer generated selection tool through which the user may select one or more portions of displayed oilfield data for auditory enhancement. Once the user has indicated an area of interest using the selection tool, the present invention may identify the oilfield data displayed within the outlined area of interest, identify auditory data associated with the displayed oilfield data utilizing one or more auditory mapping structures, and emit at least a portion of the identified auditory data to enhance the user's understanding of the displayed oilfield data.

20 Claims, 11 Drawing Sheets

(56) References Cited

U.S. PATENT DOCUMENTS

| | | | | |
|---|---|---|---|---|
| 4,906,192 | A * | 3/1990 | Smithard et al. | 434/253 |
| 6,018,497 | A * | 1/2000 | Gunasekera | 367/72 |
| 6,088,294 | A * | 7/2000 | Leggett et al. | 367/25 |
| 7,135,635 | B2 * | 11/2006 | Childs et al. | 84/600 |
| 7,340,384 | B2 * | 3/2008 | Delhomme et al. | 703/10 |
| 7,379,854 | B2 * | 5/2008 | Calvert et al. | 703/10 |
| 7,894,301 | B2 * | 2/2011 | Eperjesi et al. | 367/77 |
| 8,359,185 | B2 * | 1/2013 | Pita et al. | 703/9 |
| 8,437,996 | B2 * | 5/2013 | Usadi et al. | 703/10 |
| 8,682,589 | B2 * | 3/2014 | Thigpen et al. | 702/12 |
| 2008/0288226 | A1 * | 11/2008 | Gurpinar et al. | 703/10 |
| 2011/0051996 | A1 * | 3/2011 | Gudmundson et al. | 382/100 |
| 2013/0338985 | A1 * | 12/2013 | Garcia et al. | 703/10 |

OTHER PUBLICATIONS

Hermann, et al., "Crystallization sonification of high-dimensional datasets", ACM Transactions on Applied Perception, vol. 2 (4), Oct. 2005, pp. 550-558.

Hermann, et al., "Listen to your Data: Model-Based Sonification for Data Analysis", Advances in Intelligent Computing and Multimedia Systems, 1999, pp. 189-194.

Hunt, et al., "Interacting with sonification systems: closing the loop", IEEE Proceedings, Eighth International Conference on Information Visualization, Jul. 14-16, 2004, pp. 879-884.

Minghim, et al., "An illustrated analysis of sonification for scientific visualization", IEEE Conference on Visualization, 1995, pp. 110-117.

Salvador, et al., "An interaction model for scientific visualization using sound", Brazilian Symposium on Computer Graphics and Image Processing, Oct. 12-15, 2003, pp. 132-139.

* cited by examiner

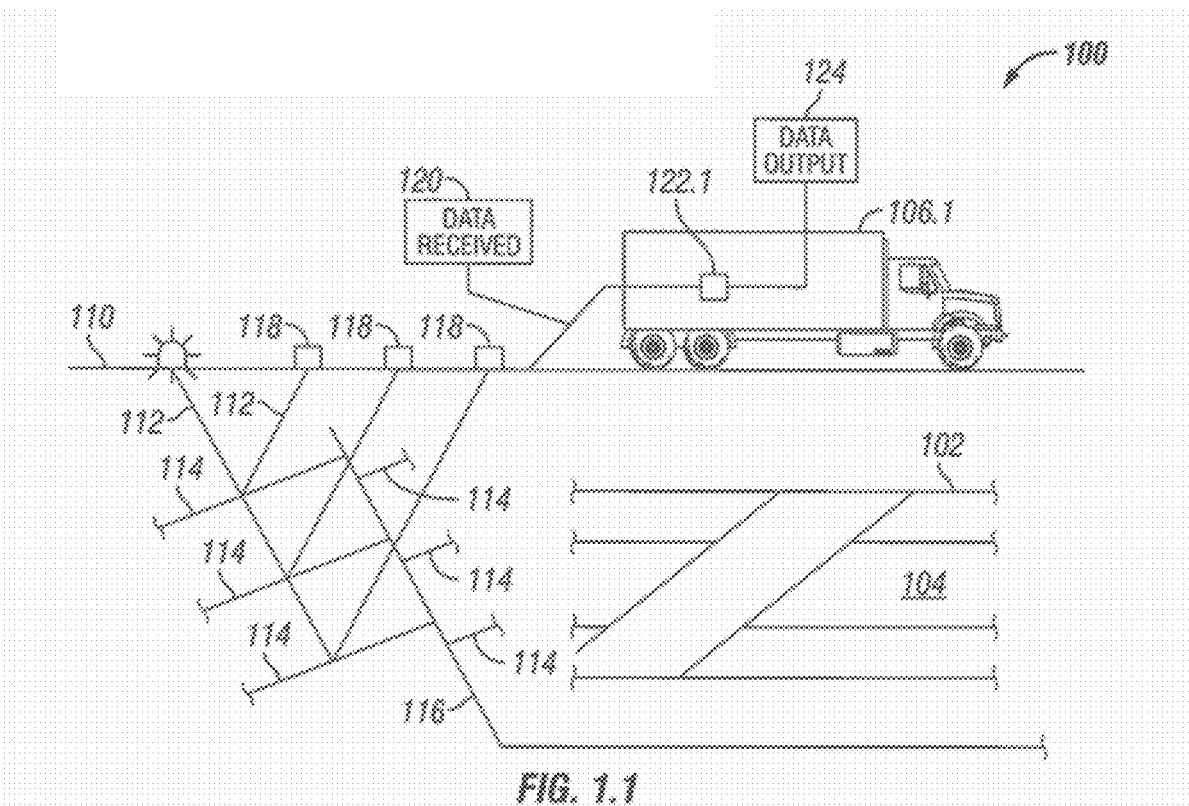
FIG. 1.1
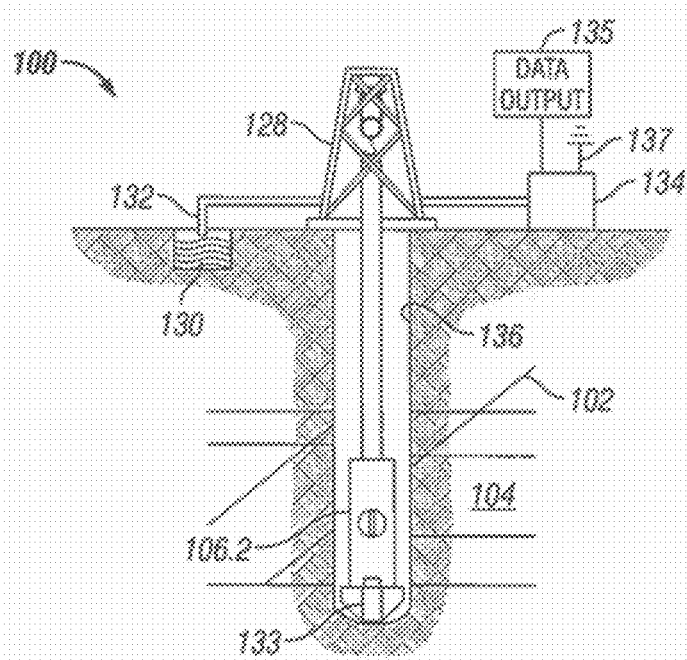
FIG. 1.2

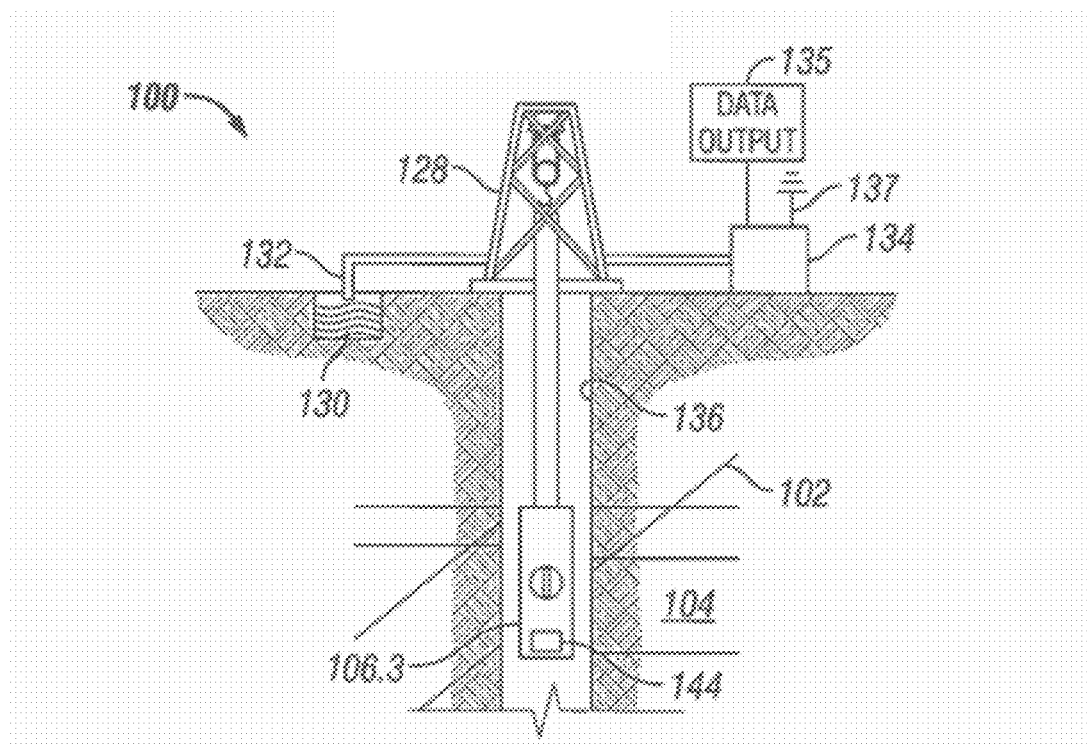
FIG. 1.3
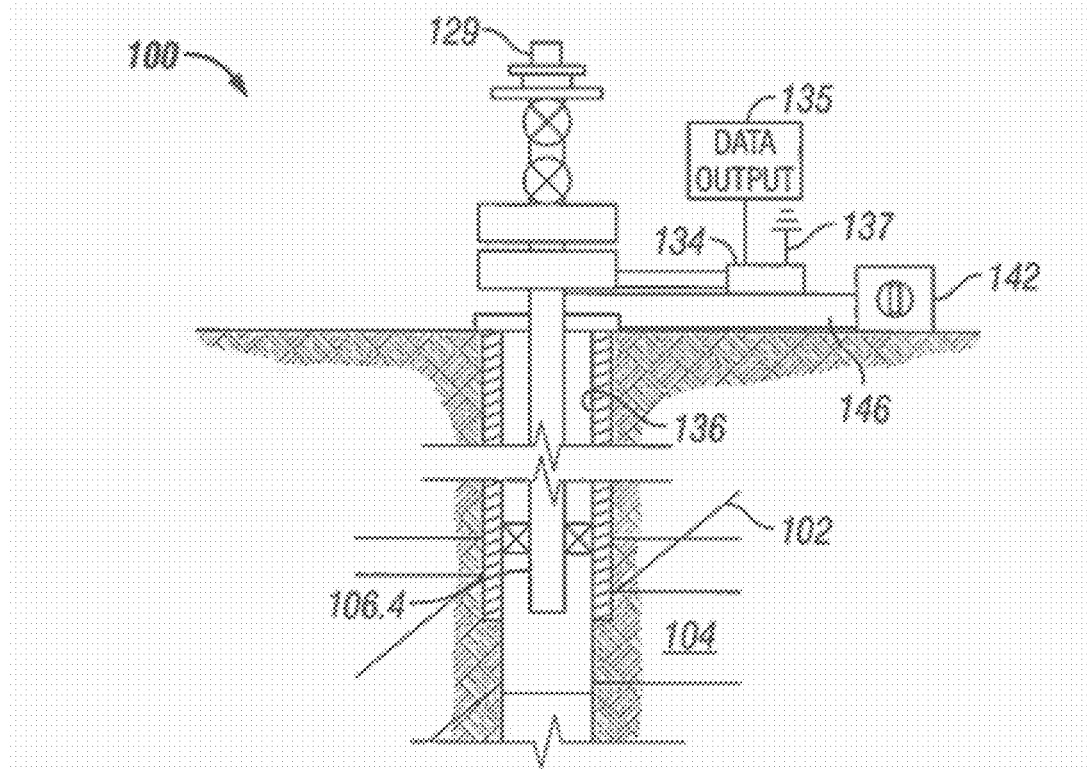
FIG. 1.4

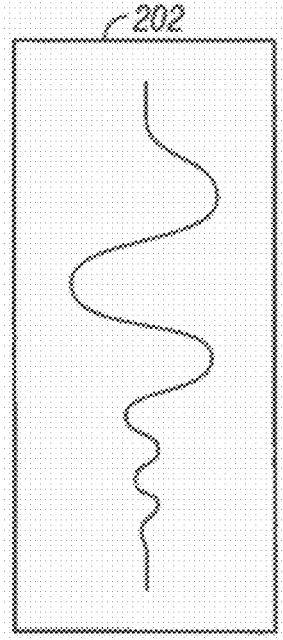
FIG. 2.1
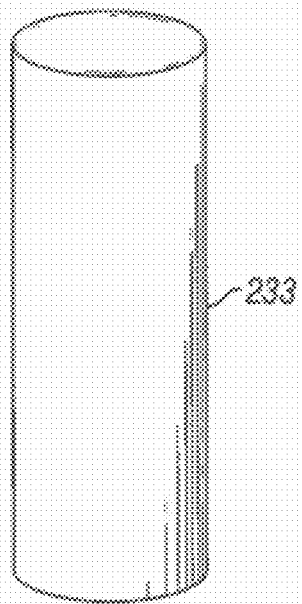
FIG. 2.2
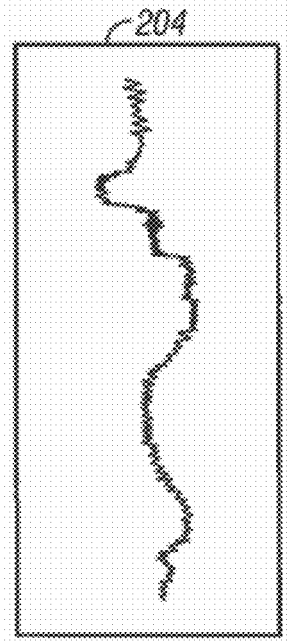
FIG. 2.3
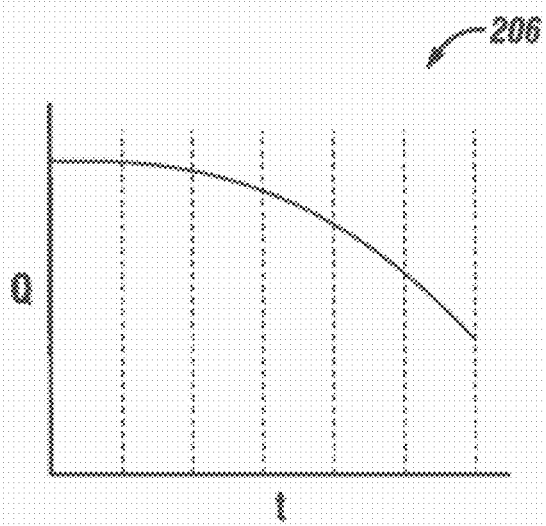
FIG. 2.4

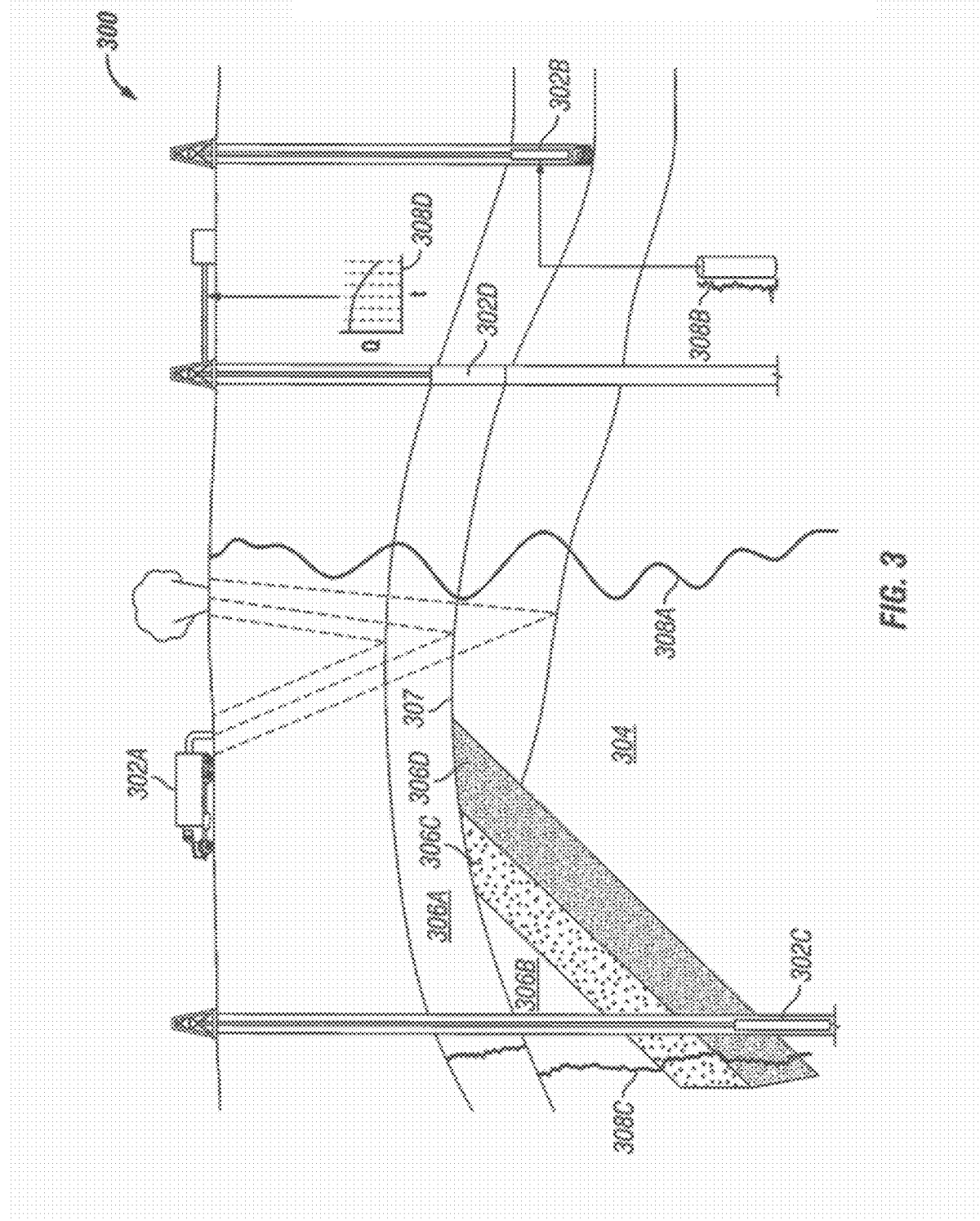

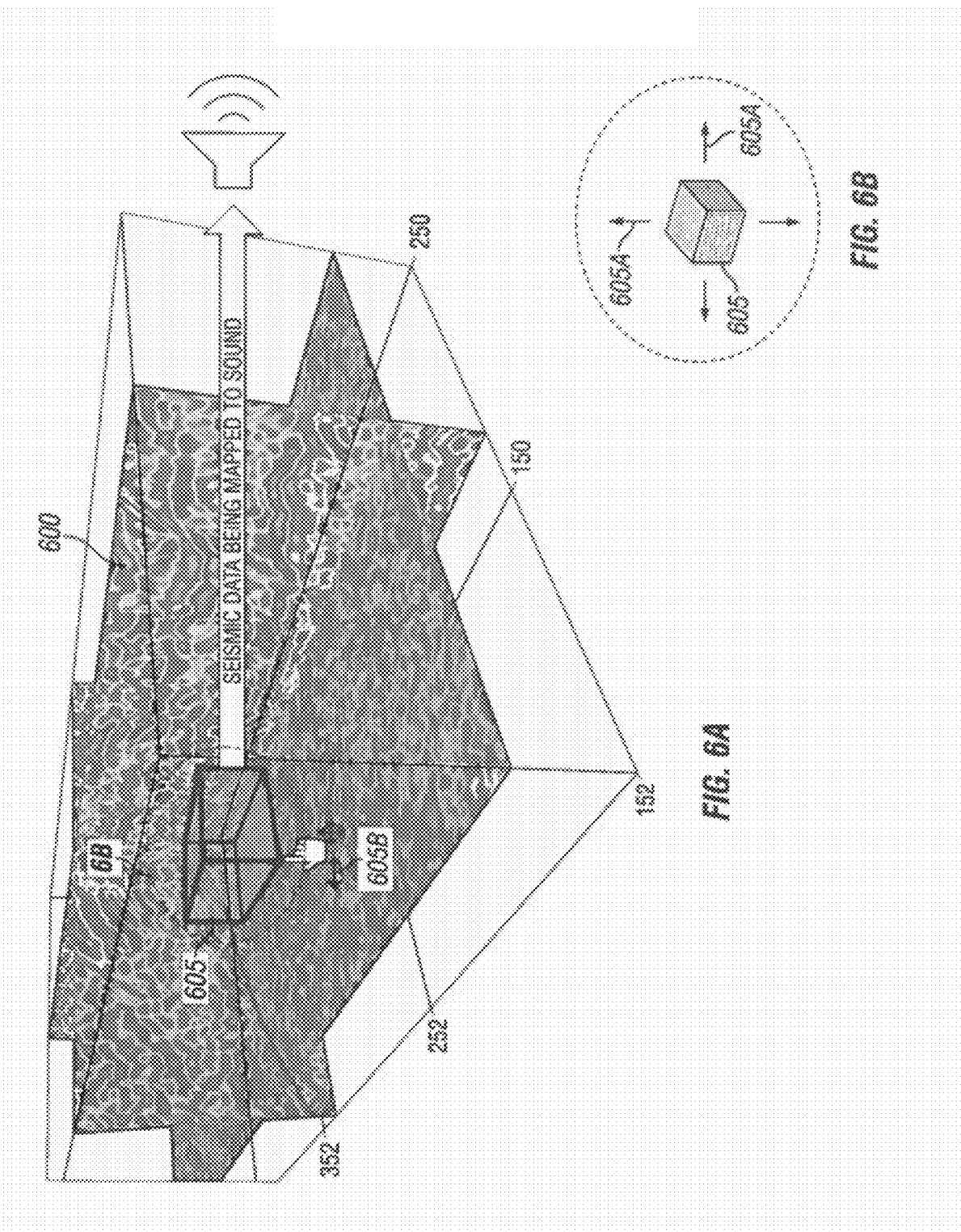

RESERVOIR PROPERTIES BEING MAPPED TO SOUND

US 8,994,549 B2

SYSTEM AND METHOD OF FACILITATING OILFIELD OPERATIONS UTILIZING AUDITORY INFORMATION

CROSS REFERENCE TO RELATED APPLICATION

This application claims benefit of U.S. Provisional Patent Application Ser. No. 61/437,037 filed Jan. 28, 2011, which is incorporated herein by reference in its entirety.

FIELD OF THE INVENTION

The present invention relates generally to oilfield operations and, more particularly, to systems and methods directed to the use of auditory information in conjunction with oilfield exploration and production activities.

BACKGROUND OF THE INVENTION

Oilfield operations generate a great deal of electronic data. Such data may be used to access oilfield conditions and make decisions concerning future oilfield operations such as well planning, well targeting, well completions, production rates, and other operations and/or operating parameters. Often this information is used to determine when (and/or where) to drill new wells, re-complete existing wells, or alter wellbore production characteristics.

Oilfield data may be collected using sensors positioned about the oilfield. For example, sensors on the surface may monitor seismic exploration activities, sensors in the drilling equipment may monitor drilling conditions, sensors in the wellbore may monitor fluid composition, sensors located along the flow path may monitor flow rates and sensors at the processing facility may monitor fluids collected.

Computer modeling and simulation of oilfield data is a vital component of oil and gas exploration. Such systems typically conduct some form of computational processing upon acquired oilfield data and then export the processed data to one or more data visualization application(s) for review by authorized personnel. Such systems may also use a color mapping structure to generate graphic visualizations of acquired data in order to assist users in interpreting and analyzing the acquired data.

Unfortunately, most modern graphical applications do not use auditory information to convey information regarding acquired oilfield data to the user in a meaningful way. Such applications relegate auditory information to a secondary role, e.g., alerts or alarms to communicate errors.

As such, there remains a need for a system and method capable of enhancing the analysis of oilfield data utilizing auditory information.

SUMMARY OF THE INVENTION

Accordingly, the present invention provides a system and method for facilitating oilfield operations utilizing auditory data. The present invention provides one or more sound mapping structures for oilfield data relating to one or more oilfield operations. In one embodiment, oilfield data may include a plurality of oilfield data types that may be of interest to the user in relation to one or more oilfield operations.

In one embodiment, the present invention generates one or more auditory mapping structures whereby specific oilfield data are mapped (or matched) to one or more specific sounds or groups of sounds. The auditory mapping structure may be saved to the storage device and linked to at least one data visualization application capable of accessing and displaying acquired oilfield using one or more graphic user interfaces.

The present invention provides at least one computer generated selection tool through which the user may select one or more portions of displayed oilfield data for auditory enhancement. In one embodiment, the selection tool comprises a substantially rectangular outline (for 2D displays) or a substantially cubic outline (for 3D and 4D displays) superimposed upon or embedded into displayed oilfield data. In one embodiment, the selection tool may be resized and moved in any direction by the user using a mouse, keyboard or other desired input device.

Once the user has indicated an area of interest using the selection tool, the present invention may identify the oilfield data displayed within the outlined area of interest, identify auditory data associated with the displayed oilfield data utilizing one or more auditory mapping structures, and emit at least a portion of the identified auditory data for the user to listen to.

In one embodiment, the present invention may apply pitch, frequency and/or timbre variations to each sound as it relates to each oilfield data type during the mapping process. This feature of the present invention allows the system to convey oilfield data distinctions to the user in a simple and effective manner. The present invention may utilize a direct/inverse relationship and/or a complimentary/supplementary relationship between the displayed oilfield data and the emitted sound(s).

In one embodiment, the present invention may provide at least one settings interface through which the user may enter or amend system settings. The present invention may also provide customization options whereby the user may amend the default auditory mapping structure by importing custom sounds to be used in conjunction with oilfield data.

In one embodiment, the present invention may be used to enhance the analysis of oilfield data directed to the fluid flow characteristics of a subterranean formation. In one embodiment, the present invention utilizes auditory data to assist the user in understanding actual and/or predicted fluid flow data displayed by the data visualization application.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; it being understood that the drawings contained herein are not necessarily drawn to scale and that the accompanying drawings provide illustrative implementations and are not meant to limit the scope of various technologies described herein; wherein:

FIG. 1.1 is an example oilfield survey operation being performed by a seismic truck.

FIG. 1.2 is an example oilfield drilling operation being performed by a drilling tool suspended by a rig and advanced into the subterranean formation.

FIG. 1.3 is an example oilfield wireline operation being performed by a wireline tool suspended by the rig and into the wellbore of FIG. 1.2.

FIG. 1.4 is an example oilfield simulation operation being performed by a simulation tool being deployed from the rig and into a completed wellbore for drawing fluid from the downhole reservoir into a surface facility.

FIG. 2.1 is an example oilfield seismic trace of the subterranean formation of FIG. 1.1.

FIG. 2.2 is an example oilfield core sample of the example formation shown in FIG. 1.2.

FIG. 2.3 is an example oilfield well log of the subterranean formation of FIG. 1.3.

FIG. 2.4 is an example simulation decline curve of fluid flowing through the example subterranean formation of FIG. 1.4.

FIG. 3 is a schematic view, partially in cross section, of an example oilfield operation having a plurality of data acquisition tools positioned at various locations along the oilfield operation for collecting data from the subterranean formation.

FIG. 6 illustrates a 3D visualization of seismic data and a selection tool of one embodiment of the present invention.

DETAILED DESCRIPTION OF THE INVENTION

Figure 4:
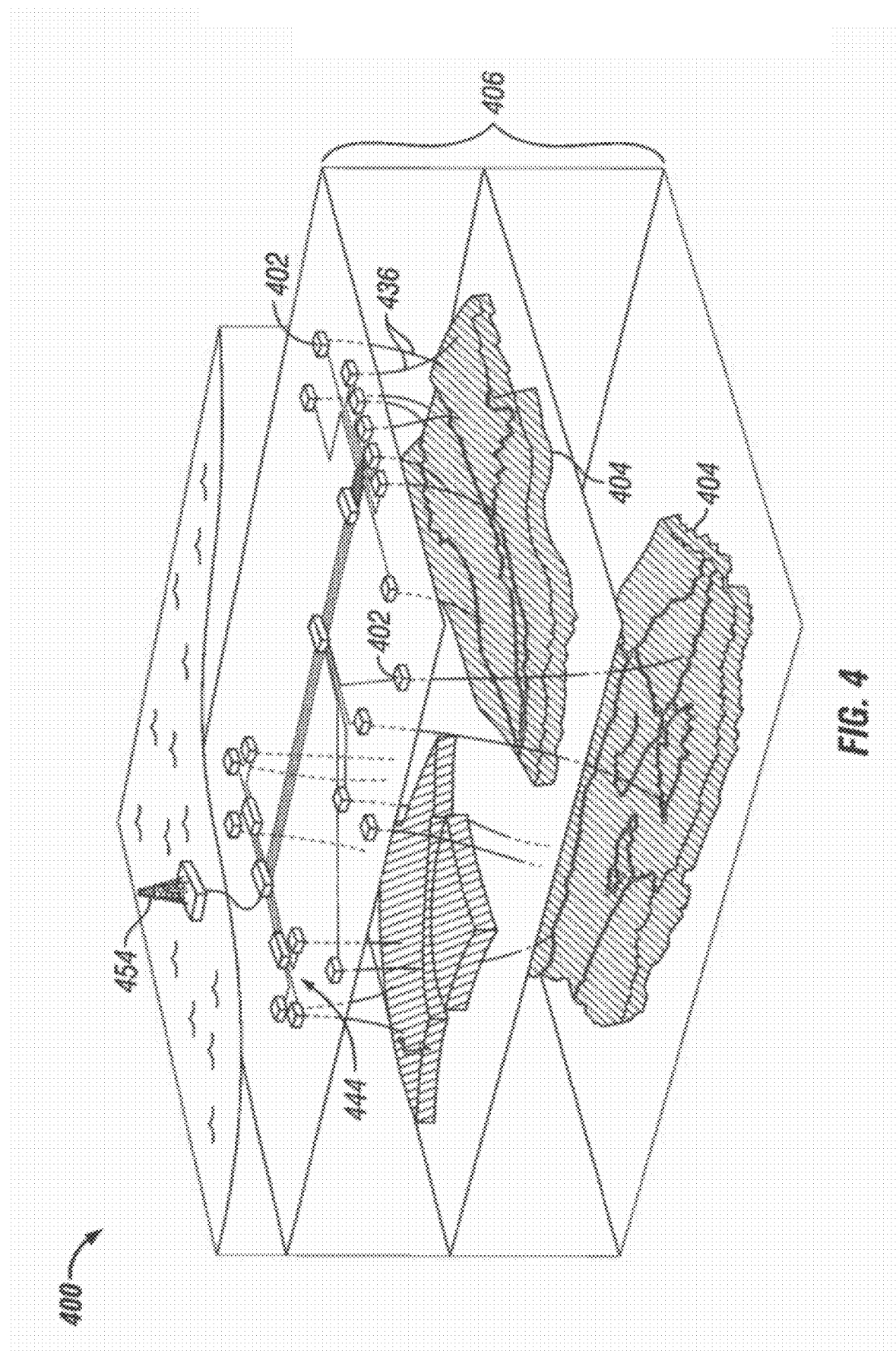
FIG. 4 is an example schematic view of an oilfield operation having a plurality of wellsites for producing hydrocarbons from the subterranean formation.

In the following description, numerous details are set forth to provide an understanding of the present invention. However, it will be understood by those skilled in the art that the present invention may be practiced without these details and that numerous variations or modifications from the described embodiments may be possible.

The present invention is herein described as a method of facilitating oilfield operations using auditory data, as a computer-readable storage medium for facilitating oilfield operations using auditory data, and as an oilfield analysis system.

By way of background, FIGS. 1.1-1.4 illustrate simplified, schematic views of oilfield (100) having subterranean formation (102) containing reservoir (104) therein in accordance with implementations of various technologies and techniques described herein.

FIG. 1.1 illustrates a survey operation being performed by a survey tool, such as seismic truck (106.1), to measure properties of the subterranean formation. In this example, the survey operation is a seismic survey operation for producing sound vibrations. In FIG. 1.1, sound vibrations (112) generated by source (110), reflects off horizons (114) in earth formation (116). A set of sound vibrations is received by sensors, such as geophone-receivers (118), situated on the earth's surface. The data received (120) is provided as input data to a computer (122.1) of a seismic truck (106.1), and responsive to the input data, computer (122.1) generates seismic data output (124). This seismic data output may be stored, transmitted or further processed as desired, for example, by data reduction.

FIG. 1.2 illustrates a drilling operation being performed by drilling tool (106.2) suspended by rig (128) and advanced into subterranean formations (102) to form wellbore (136). Mud pit (130) is used to draw drilling mud into the drilling tools via flow line (132) for circulating drilling mud down through the drilling tools, then up wellbore (136) and back to the surface. The drilling mud is usually filtered and returned to the mud pit.

A circulating system may be used for storing, controlling or filtering the drilling mud. The drilling tools are advanced into subterranean formations (102) to reach reservoir (104). Each well may target one or more reservoirs. The drilling tools may be adapted for measuring downhole properties using logging while drilling tools. The logging while drilling tools may also be adapted for taking core sample (133).

Computer facilities may be positioned at various locations about the oilfield (100) (e.g., the surface unit 134) and/or at remote locations. Surface unit (134) may be used to communicate with the drilling tools and/or offsite operations, as well as with other surface or downhole sensors. Surface unit is capable of communicating with the drilling tools to send commands to the drilling tools, and to receive data therefrom. Surface unit may also collect data generated during the drilling operation and produces data output (135), which may then be stored or transmitted.

Sensors (S), such as gauges, may be positioned about oilfield (100) to collect data relating to various oilfield operations as described previously. As shown, sensor (S) may be positioned in one or more locations in the drilling tools and/or at rig (128) to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools (106.2) may include a bottom hole assembly (BHA) (not shown) near the drill bit (e.g., within several drill collar lengths from the drill bit). The bottom hole assembly may include capabilities for measuring, processing, and storing information, as well as communicating with the surface unit. The bottom hole assembly further may further include drill collars for performing various other measurement functions.

The data gathered by sensors (S) may be collected by the surface unit and/or other data collection sources for analysis or other processing. The data collected by sensors (S) may be used alone or in combination with other data. The data may be collected in one or more databases and/or transmitted on or offsite. The data may be historical data, real time data or combinations thereof. The real time data may be used in real time, or stored for later use. The data may also be combined with historical data or other inputs for further analysis. The data may be stored in separate databases, or combined into a single database.

Surface unit (134) may include transceiver (137) to allow communications between surface unit 134 and various portions of the oilfield (100) or other locations. The surface unit may also be provided with one or more controllers (not shown) for actuating mechanisms at the oilfield. The surface unit may then send command signals to the oilfield in response to data received.

The surface unit may receive commands via transceiver (137) or may itself execute commands to the controller. A processor may be provided to analyze the data (locally or remotely), make the decisions and/or actuate the controller. In this manner, the oilfield may be selectively adjusted based on the data collected. This technique may be used to optimize portions of the field operation, such as controlling drilling, weight on bit, pump rates or other parameters. These adjustments may be made automatically based on computer protocol, and/or manually by an operator. In some cases, well plans may be adjusted to select optimum operating conditions, or to avoid problems.

FIG. 1.3 illustrates a wireline operation being performed by wireline tool (106.3) suspended by rig (128) and into wellbore (136) of FIG. 1.2. The wireline tool may be adapted for deployment into the wellbore for generating well logs, performing downhole tests and/or collecting samples. The wireline tool may be used to provide another method and apparatus for performing a seismic survey operation. The wireline tool may, for example, have an explosive, radioactive, electrical or acoustic energy source (144) that sends and/or receives electrical signals to surrounding subterranean formations (102) and fluids therein.

Wireline tool (106.3) may be operatively connected to, for example, geophones (118) and a computer (122.1) of a seismic truck (106.1) of FIG. 1.1. Wireline tool (106.3) may also provide data to surface unit (134). Surface unit (134) may collect data generated during the wireline operation and may produce data output (135) that may be stored or transmitted. Wireline tool (106.3) may be positioned at various depths in the wellbore (136) to provide information relating to the subterranean formation (102).

Sensors (S), such as gauges, may be positioned about oilfield (100) to collect data relating to various field operations as described previously. As shown, sensor S is positioned in wireline tool (106.3) to measure downhole parameters which relate to, for example porosity, permeability, fluid composition and/or other parameters of the oilfield operation.

FIG. 1.4 illustrates a production operation being performed by production tool (106.4) deployed from a production unit or Christmas tree (129) and into completed wellbore (136) for drawing fluid from the downhole reservoirs into surface facilities (142). The fluid flows from reservoir (104) through perforations in the casing (not shown) and into production tool (106.4) in wellbore (136) and to surface facilities (142) via gathering network (146).

Sensors (S), such as gauges, may be positioned about oilfield (100) to collect data relating to various field operations as described previously. As shown, the sensor (S) may be positioned in production tool (106.4) or associated equipment, such as Christmas tree (129), gathering network (146), surface facility (142), and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1.2-1.4 illustrate tools used to measure data relating to an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

FIGS. 2.1-2.4 are example graphical depictions of data collected by the tools of FIGS. 1.1-1.4. FIG. 2.1 depicts a seismic trace (202) of the subterranean formation of FIG. 1.1 taken by survey tool (106a). The seismic trace measures a two-way response over a period of time. FIG. 2.2 depicts a core sample (233) taken by the drilling tool (106.2). The core test typically provides a graph of the density, resistivity or other physical property of the core sample (233) over the length of the core. Tests for density and viscosity are often performed on the fluids in the core at varying pressures and temperatures. FIG. 2.3 depicts a well log(204) of the subterranean formation of FIG. 1.3 taken by the wireline tool (106.3). The wireline log typically provides a resistivity measurement of the formation at various depths. FIG. 2.4 depicts a production decline curve (206) of fluid flowing through the subterranean formation of FIG. 1.4 taken by the production tool (106.4). The production decline curve (206) typically provides the production rate Q as a function of time t.

The respective graphs of FIGS. 2.1-2.3 contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2.4 provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

FIG. 3 is a schematic view, partially in cross section of an oilfield (300) having data acquisition tools (302a), (302b), (302c), and (302d) positioned at various locations along the oilfield for collecting data of a subterranean formation (304). The data acquisition tools (302a-302d) may be the same as data acquisition tools (106a-106d) of FIG. 1, respectively. As shown, the data acquisition tools (302a-302d) generate data plots or measurements (308a-308d), respectively.

Data plots (308a-308c) are examples of static data plots that may be generated by the data acquisition tools (302a-302d), respectively. Static data plot (308a) is a seismic two-way response time and may be the same as the seismic trace (202) of FIG. 2.1. Static plot (308b) is core sample data measured from a core sample of the formation (304), similar to the core sample (133) of FIG. 2.2. Static data plot (308c) is a logging trace, similar to the well log(204) of FIG. 2.3. Data plot (308d) is a dynamic data plot of the fluid flow rate over time, similar to the graph (206) of FIG. 2.4. Other data may also be collected, such as historical data, user inputs, economic information, other measurement data and other parameters of interest.

The subterranean formation (304) has a plurality of geological structures (306a-306d). As shown, the formation has a sandstone layer (306a), a limestone layer (306b), a shale layer (306c) and a sand layer (306d). A fault line (307) extends through the formation. The static data acquisition tools are preferably adapted to measure the formation and detect the characteristics of the geological structures of the formation.

While a specific subterranean formation (304) with specific geological structures is depicted, it will be appreciated that the formation may contain a variety of geological structures. Fluid may also be present in various portions of the formation. Each of the measurement devices may be used to measure properties of the formation and/or its underlying structures in order to generate oilfield data. While each acquisition tool is shown as being in specific locations along the formation, it will be appreciated that one or more types of measurement may be taken at one or more location across one or more oilfields or other locations for comparison and/or analysis.

The data collected from various sources, such as the data acquisition tools of FIG. 3, may then be evaluated using one or more data visualization applications. Typically, seismic data displayed in the static data plot (308a) from the data acquisition tool (302a) is used by a geophysicist to determine characteristics of the subterranean formation (304). Core data shown in static plot (308b) and/or log data from the well log (308c) is typically used by a geologist to determine various characteristics of the geological structures of the subterranean formation (304). Production data from the production graph (308d) is typically used by the reservoir engineer to determine fluid flow reservoir characteristics.

FIG. 4 shows an oilfield (400) for performing simulation operations. As shown, the oilfield has a plurality of wellsites (402) operatively connected to a central processing facility (454). Part, or all of the oilfield, may be on land and/or sea. Also, while a single oilfield with a single processing facility and a plurality of wellsites is depicted, any combination of one or more oilfields, one or more processing facilities and one or more wellsites may be present.

Each wellsite (402) has equipment that forms a wellbore (436) into the earth. The wellbores extend through subterranean formations (406) including reservoirs (404). These reservoirs (404) contain fluids, such as hydrocarbons. The wellsites draw fluid from the reservoirs and pass them to the processing facilities via surface networks (444). The surface networks (444) have tubing and control mechanisms for controlling the flow of fluids from the wellsite to the processing facility (454).

Figure 5:
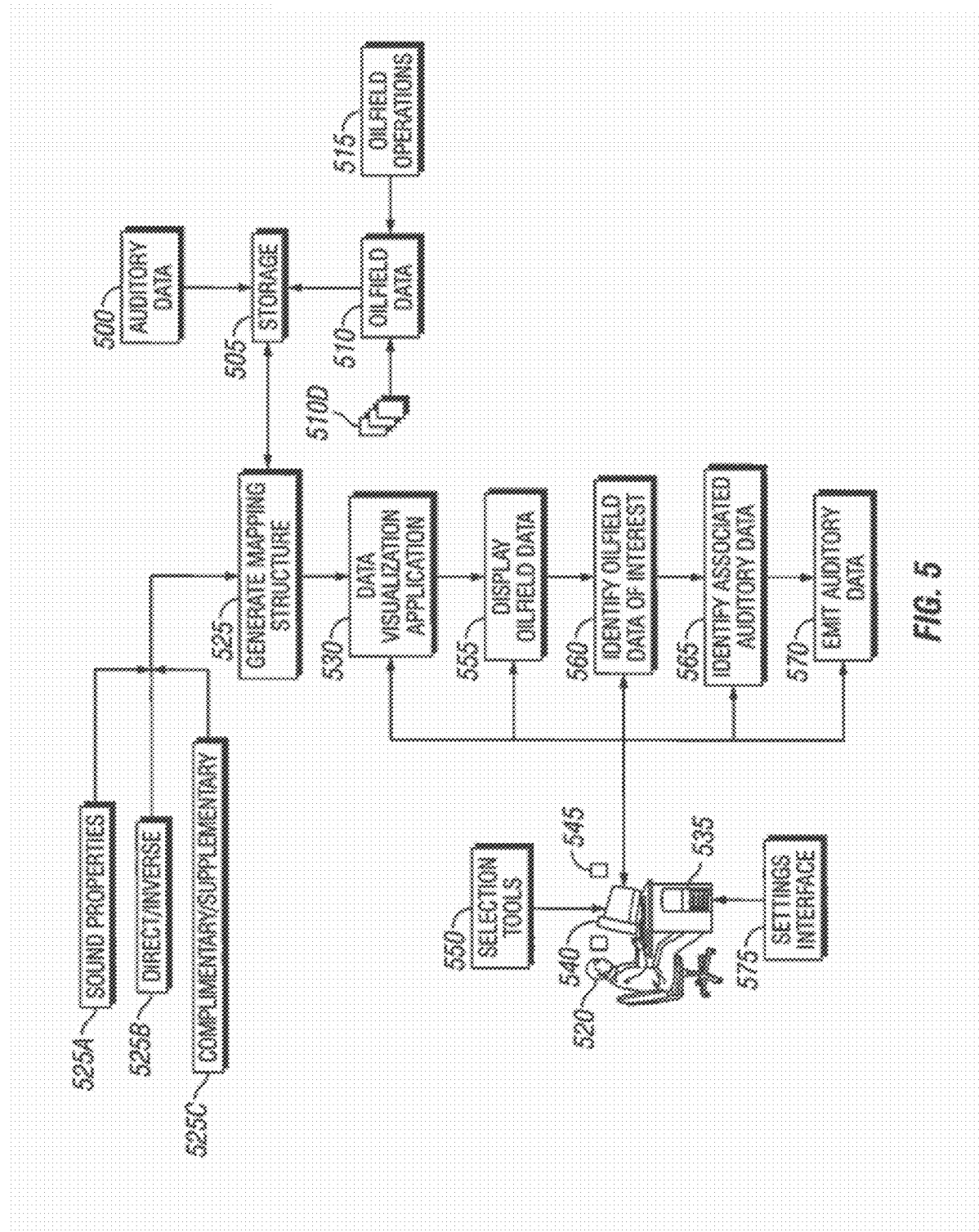
FIG. 5 is a flowchart diagram illustrating the auditory emission process of one embodiment of the present invention.

Referring to FIG. 5, the present invention provides a system, method and computer readable medium for facilitating oilfield operations utilizing auditory data. In order to facilitate the efficient analysis of oilfield data, the present invention provides one or more libraries of auditory data (500) capable of complimenting and/or supplementing the visualization of oilfield data during various aspects of an oilfield operation.

In one embodiment, the present invention utilizes one or more computer databases (505) for storing auditory data (500) and acquired oilfield data (510) relating to one or more oilfield operations (515). In one embodiment, oilfield data may include a plurality of oilfield data types (510D) that may be of interest to the user (520) in relation to one or more oilfield operations.

In one embodiment, the present invention generates one or more auditory mapping structures whereby specific oilfield data are mapped (or matched) to one or more specific sounds or groups of sounds contained within the stored auditory data, as illustrated by Box (525). The auditory mapping structure may be saved to the storage device and linked to at least one data visualization application (530) capable of accessing and displaying acquired oilfield data upon one or more graphic user interfaces coupled to the storage device (505).

The auditory mapping structure(s) generated by the present invention may be compatible with a plurality of data visualization applications. In one embodiment, the auditory mapping structure may be arranged according to the type of oilfield data displayed by the data visualization application. For example, a first mapping structure may be generated for use with data visualization applications designed to display seismic data while a second mapping structure may be generated for use with data visualization applications designed to display reservoir properties.

Further, in one embodiment, individual sounds or group of sounds may be matched to oilfield data types and/or subsets of same, such as seismic data, electromagnetic data, geological data, resistivity data, regional data and gravitational data. Regional data, for example, may include oilfield data accumulated for a given geographic region over a period of time. Gravitational data may include oilfield data and/or maps drawn to measurements concerning the physical properties of the formation including information drawn to gravitational anomalies such as salt domes, faults, etc.

In one embodiment, the present invention may provide a default auditory mapping structure based upon (1) the types of oilfield data stored in the database and/or (2) the types of oilfield data presented by one or more data visualization applications (530). In one embodiment, the present invention may be utilized in conjunction with a stand-alone oilfield data visualization application, such as the Petrel® or Visage® systems offered by Schlumberger, or equipped with its own proprietary data visualization package.

It should be understood that the present invention may be utilized in conjunction with any suitable visualization package and that the novel use of complimentary and/or supplementary auditory information described herein is not limited to use with the example data types or example data visualization packages. Further, the invention may be used at any phase of an oilfield operation including, but not limited to, during the interpretation of seismic data, during modeling of formational characteristics or reservoir properties (including surface modeling), and/or during operational monitoring and analysis activities.

In one embodiment, oilfield data and auditory data may be presented to the user via a computer system (535) having a graphic user interface (540) and at least one speaker (545) arrangement. In one embodiment, the oilfield data may be displayed to the user using a two, three or four dimensional arrangement. In one embodiment, a two dimensional arrangement may include x and y axis components, a three dimensional arrangement may include x, y and z components, and a four dimensional arrangement may include x, y, z components along with a time component.

The present invention provides at least one computer generated selection tool (550) through which the user (520) may select one or more portions of displayed oilfield data (555) for auditory enhancement. In one embodiment, the selection tool comprises a substantially rectangular outline (for 2D displays) or a substantially cubic outline (for 3D and 4D displays) superimposed upon or embedded into displayed oilfield data.

FIG. 6 provides an example three dimensional display of oilfield data (600) concerning an oilfield operation of interest. In this example, acquired seismic data has been processed by a data visualization application and displayed according to a 3D color arrangement. In this example, the present invention provides a graphic selection tool (605) superimposed upon the displayed seismic data such that the user may select an area of interest. In one embodiment, the selection tool may be resized or moved in any direction by the user using a mouse, keyboard or other desired input device, as illustrated by arrows (605A) and (605B). Further, multiple selection tools (or cubes in this example) may be utilized such that the user may select multiple areas of interest for comparison.

Once the user has indicated an area of interest using the selection tool, the present invention may identify the oilfield data displayed within the outlined area of interest, identify auditory data associated with the displayed oilfield data utilizing one or more auditory mapping structures, and emit at least a portion of the identified auditory data for the user to listen to, as illustrated by Boxes (560), (565), and (570) of FIG. 5.

In one embodiment, a sound may be generated for the oilfield data included within the selection tool outline. The user may also move the selection tool around, such that he or she will hear sounds produced by the movement of the selection tool. In this embodiment, two types of sounds may be produced: (1) a peak sound may be generated when the user starts the movement of the selection tool, which is composed by the sound of the new selection tool positioning; and (2) a fading-out sound after the selection tool has started moving, in which more oilfield data-to-sound mappings can be applied (for example, if the selection tool has currently a larger size than the unitary size of the oilfield data itself, sounds may be sequentially generated for the subparts of the current selection tool size, in a cascading manner, in order to quickly give the user a sense of all data located within selection tool outline).

Figure 7A:
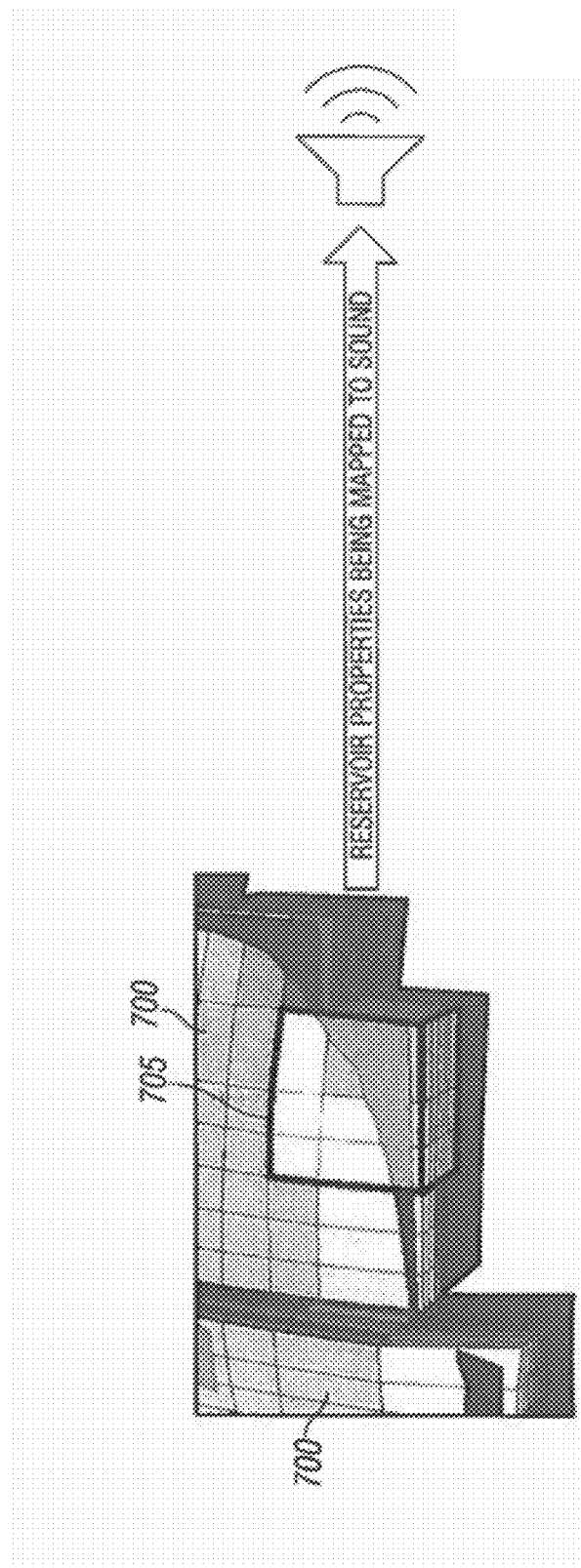
FIG. 7 illustrates a partial 3D visualization of reservoir data and a selection tool of one embodiment of the present invention.
Figure 7B:
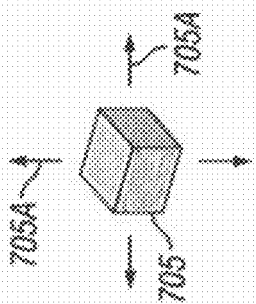

FIG. 7 provides another example of a three dimensional display of oilfield data (700) concerning an oilfield operation of interest. In this example, acquired reservoir data has been processed by a data visualization application and displayed according to a 3D color grid arrangement. In this example, the present invention provides a graphic selection tool (705) that may be superimposed or embedded within the displayed reservoir data such that the user may select an area of interest.

To better understand the reservoir, the user may be interested in the dynamic properties of the reservoir such as pressure and saturation of fluids through time, as well as static properties such as permeability. In 4D workflows, it may be especially important to compare fluid saturations with seismic data to see if the predicted fluid saturations match the seismic response. By using a selection tool to navigate in the reservoir model, the user is able to experience more properties at the same time, visualizing one of them while hearing another. This is an example of a complimentary use of auditory data contemplated in one embodiment of the present invention. For example, in a 4D workflow, a sound being played for a selected area would indicate how wrong (or correct) the predicted fluid saturation is. In general, these and several other properties such as porosity, pressure and temperature can be combined as per users needs in order to enhance the user's understanding of the oilfield data under analysis.

In one embodiment, the selection tool may include interactive features such as a snap-to-grid feature wherein the outer limits of the selection tool automatically conform to the grid utilized by the data visualization application, as illustrated by FIG. 7. The selection tool may further be resized and/or moved about the displayed reservoir data, as indicated by arrows (705A), using a mouse, keyboard or other desired input device.

Further, multiple selection tools (or cubes in this example) may be utilized such that the user may select multiple areas of interest if desired.

In one embodiment, the selection tool may also provide a conforming feature wherein the outer limits of the selection tool may conform to features of the displayed oilfield data such as along seismic trace lines, along well paths, etc. In one embodiment, the conforming feature may also be utilized to conform to oilfield data trends such as areas of displayed data trending from lower to higher permeability values, etc.

The present invention may apply one or more sound properties to the mapping structure during the auditory mapping process, as illustrated by Box (525A) of FIG. 5. In one embodiment, the present invention may apply pitch, frequency and/or timbre variations to each sound as it relates to oilfield data during the mapping process. This feature of the present invention allows the system to convey oilfield data distinctions to the user in a simple and effective manner.

In this example, pitch may represent the perceived fundamental frequency of a sound as well as the musical scale of octaves such that the higher the octave, the higher the pitch. In this example, frequency may represent the number of a repeating event per unit time. The lower the frequency, the "thicker" the sound perception in the human ear. In this example, timbre may represent the quality of sound that distinguishes different types of voices and/or musical instruments. For example, timbre is what humans use to distinguish the saxophone from the trumpet in a jazz group, even if both instruments are playing notes at the same pitch and frequency.

In one embodiment, timbre variations may be used to help the user distinguish between sounds having the same frequency by recognizing the difference between sound sources (instruments). For example, one can readily distinguish a piano sound from a violin sound, even if the two sounds have the same pitch and frequency. In this example, a piano timbre could be utilized to denote a first oilfield property and a violin timbre would be associated to another oilfield property. This feature of the present invention allows multiple sets of oilfield data to be differentiated even if each set of oilfield data is mapped to the same frequency and pitch.

The present invention may also utilize a direct or inverse relationship between the displayed oilfield data and the emitted sound(s), as illustrated by Box (525B) of FIG. 5. In one embodiment, the present invention may utilize a direct or inverse mapping structure whereby pitch, frequency and timbre variations are used to indicate a direct or inverse relationship to the oilfield data. For example, a direct mapping structure may utilize a high pitched sound to indicate: (1) a high concentration of oilfield data (or a high concentration of a particular type of oilfield data), (2) a high density of oilfield data or data types, (3) a large number or large volume of data or data types, and/or (4) the fullness of the oilfield data or data types. In one embodiment, a direct mapping approach may be utilized in situations where data values must be identified.

In one embodiment, an inverse mapping structure applies an opposite relationship between the oilfield data and the sound presented to the user. For example, an inverse mapping structure may utilize a high pitched sound to indicate: (1) a low concentration of oilfield data (or a low concentration of a particular type of oilfield data), (2) a low density of oilfield data or data types, (3) a small number or small volume of data or data types, and/or (4) the lack of fullness of the oilfield data or data types within the selected area.

With respect to frequency, a direct mapping structure may utilize a high frequency sound to indicate oilfield data (or a particular type of oilfield data) having high or large absolute values, while a low frequency sound may be used to indicate oilfield data or data types as having low or small absolute values. In one embodiment, an inverse mapping structure applies an opposite relationship with respect to frequency. For example, an inverse mapping structure may utilize a high frequency sound to indicate oilfield data (or a particular type of oilfield data) having a lower population density or as being relatively empty, while a low frequency sound may be used to indicate oilfield data or data types as having a relatively full or high population density.

For a direct mapping arrangement, the higher (or lower) the property, the higher (or lower) the observable characteristic. For example, a sound with high pitch may be used to denote a high concentration of certain data while a low pitch may be used to denote a low concentration of certain data. An inverse mapping arrangement may be the opposite of a direct one. For example, higher sound frequency may be used to denote a lower population density. A thinner timbre may be used to denote an area of oilfield data that may be relatively empty of data values, while a thicker timbre may be used to denote an area that is relatively full of oilfield data.

The present invention may also utilize a complimentary or supplementary relationship between the displayed oilfield data and the emitted sound(s), as illustrated by Box (525C) of FIG. 5. For example, in a complimentary relationship, the user would hear sounds associated with oilfield data being displayed upon the graphic user interface. This feature of the present invention improves the perception capacity and understanding of the user by providing both visual and auditory information concerning the selected oilfield data.

In a supplementary relationship, the user would hear sounds that are not associated with the oilfield data being displayed upon the graphic user interface. This feature of the present invention allows the user to correlate different data types while also avoiding sensory overload caused by too much information.

Figure 8A:
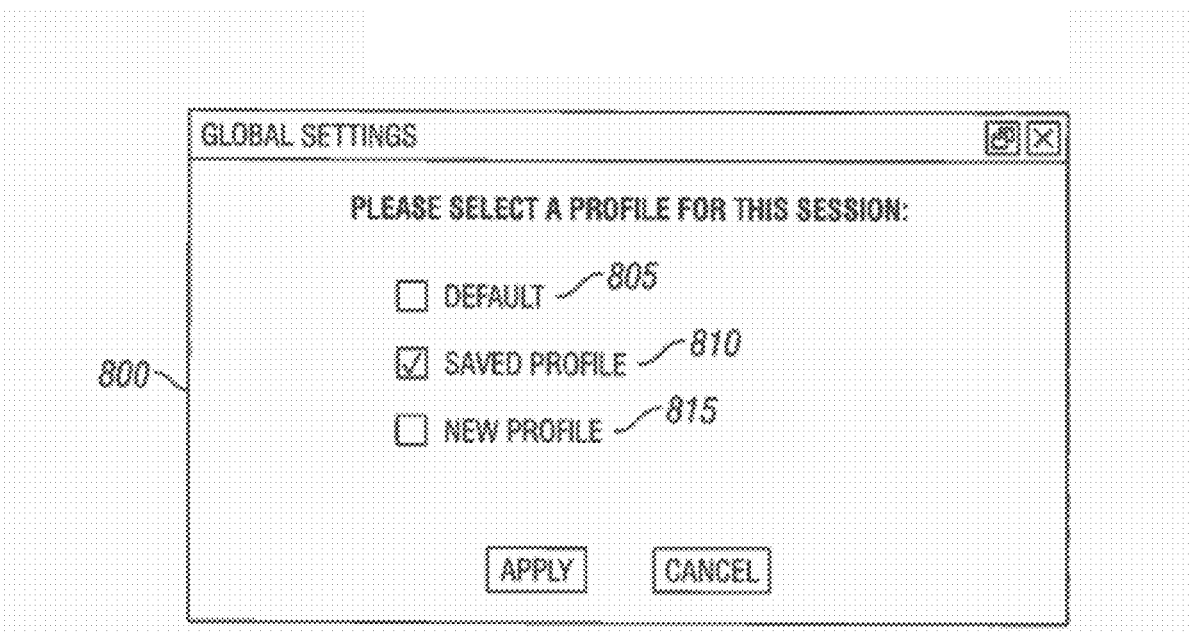
FIGS. 8A-8C are example graphic user interfaces that may be used in conjunction with one or more embodiments of the present invention.

In one embodiment, the present invention may provide at least one settings interface through which the user may enter or amend system settings, as illustrated by Box (575) of FIG. 5. In one embodiment, the setting interface of the present invention may include a global settings screen (800) through which the user may select a default profile (805), saved profile (810), or create a new profile (815), as illustrated by FIG. 8A.

In one embodiment, the default profile provided by the present invention may utilize settings that a majority of users may find to be appropriate. Default settings may vary depending on the data visualization package being used and the type of oilfield data being displayed, i.e., seismic data, reservoir data, etc.

Figure 8B:
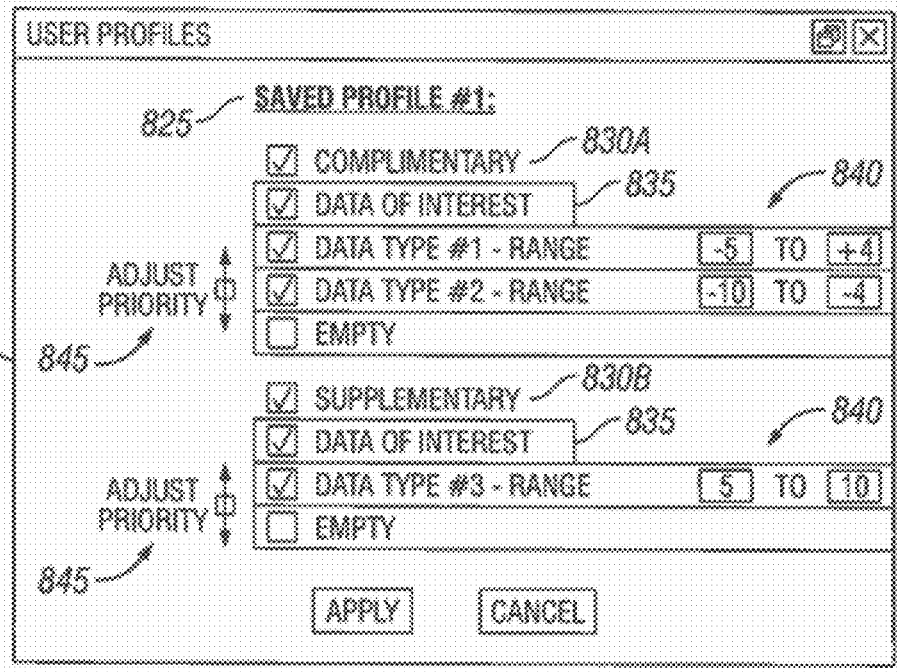

FIG. 8B illustrates an example user profile screen (820) where the user has created a profile (825) and: (1) indicated that he or she wishes to use a complimentary data arrangement (830A) for some oilfield data and a supplementary data arrangement (830B) for other data, (2) indicated that certain oilfield data types are of particular interest (835); (3) indicated that certain ranges (840) of the identified data is of interest; and (4) indicated the priority (845) to be assigned to various data types. In one embodiment, the present invention may also allow the user to indicate relative priorities between complimentary and supplementary data.

The present invention may also provide customization options whereby the user may amend the default auditory mapping structure by importing custom sounds to be used in conjunction with oilfield data. In one embodiment, this may be accomplished using a custom sounds screen (not shown) where the user may replace default sounds with custom sounds for any given oilfield data type. This feature of the present invention may also be used to allow the user to enter custom oilfield data types so that highly trained users may tailor the system to their specifications using custom oilfield data types and/or custom sounds.

Figure 8C:
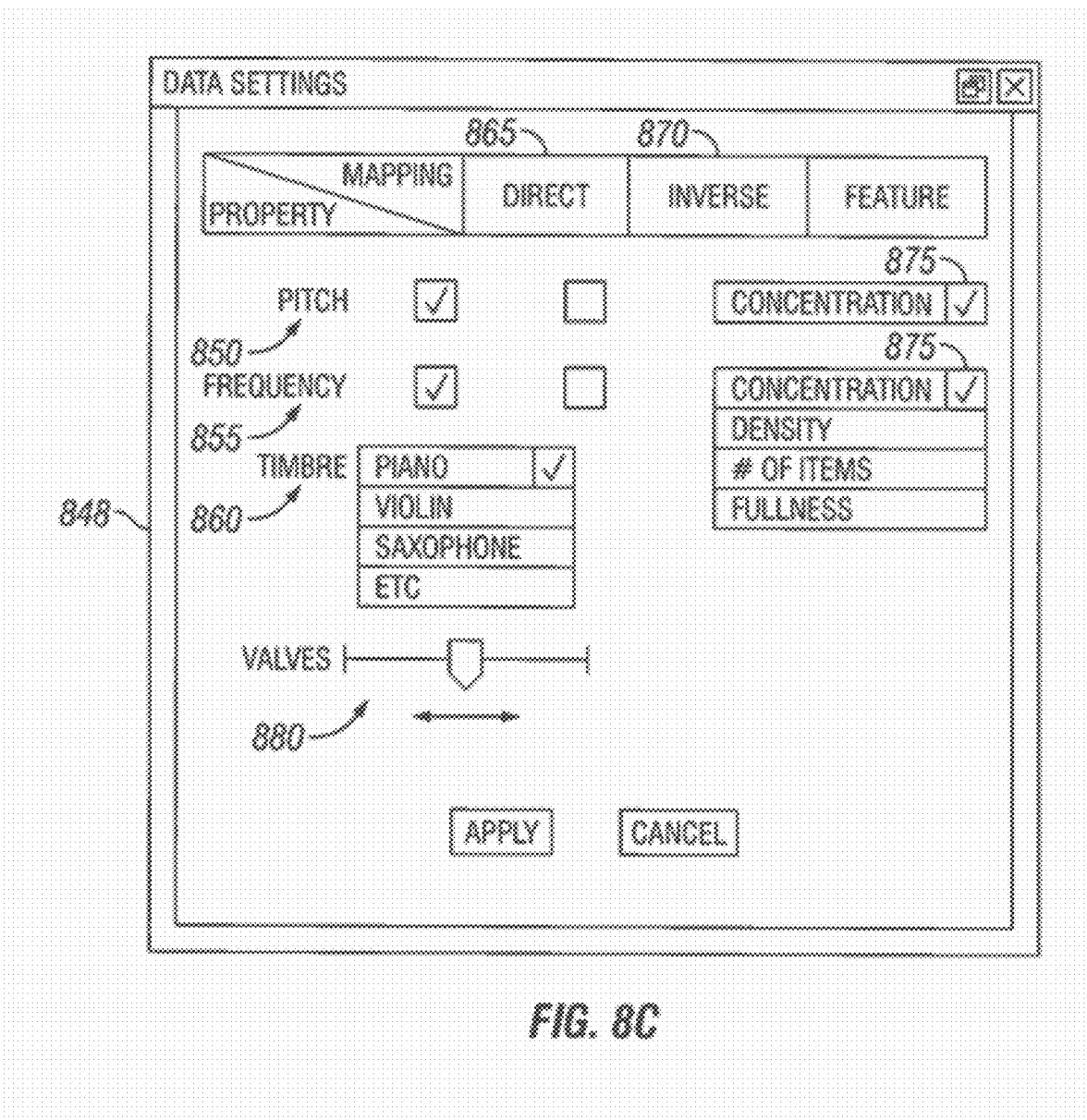

FIG. 8C illustrates an example data settings screen (848) where the user may enter additional settings relating to the use of pitch (850), frequency (855) and timbre (860) for selected oilfield data. Further, the user may enter settings relating to the use of direct or indirect auditory relationships, (865 and 870, respectively). In one embodiment, the present invention allows the user to select specific characteristics of the data to express with sound. In the example of FIG. 8C, the user may select the various parameters that pitch and frequency may be used to convey using drop down menus (875). In this example, the user may choose "concentration," "number of items" and "fullness" for pitch and/or frequency variations with respect to the selected oilfield data. In this example, the data settings screen also provides an option to vary the range (880) of data values for the selected oilfield data in order to limit the number of emitted sounds or to assign a particular importance to one set of oilfield data over another.

In one embodiment, the present invention may be applied to enhancing the analysis of oilfield data as it pertains to the actual or predicted flow of fluid through one or more formations. In this example, the data visualization package may be adapted to display fluid flow data and the present invention may provide sounds for assisting the user with understanding the actual or predicted fluid flow being displayed by the data visualization application.

In one embodiment, the present invention may provide customized fluid flow sounds for use in denoting fluid characteristics, fluid motion, vortex characterization and/or energy dissipation. Further, customized sound variations may be utilized to assist the user in assessing the fluid flow characteristics of the displayed data. For example, frequency changes may be utilized to denote density changes (the higher frequency, the denser the material); timbre may be used to represent temperature; tempo may be used to represent the speed of injection activities; stereo balance, surround sound or three-dimensional sound arrangements may be utilized to indicate the direction of fluid flow; rapid change in pitch may be used to represent voracity; and the pitch span may be used to represent vortex size.

Figure 9:
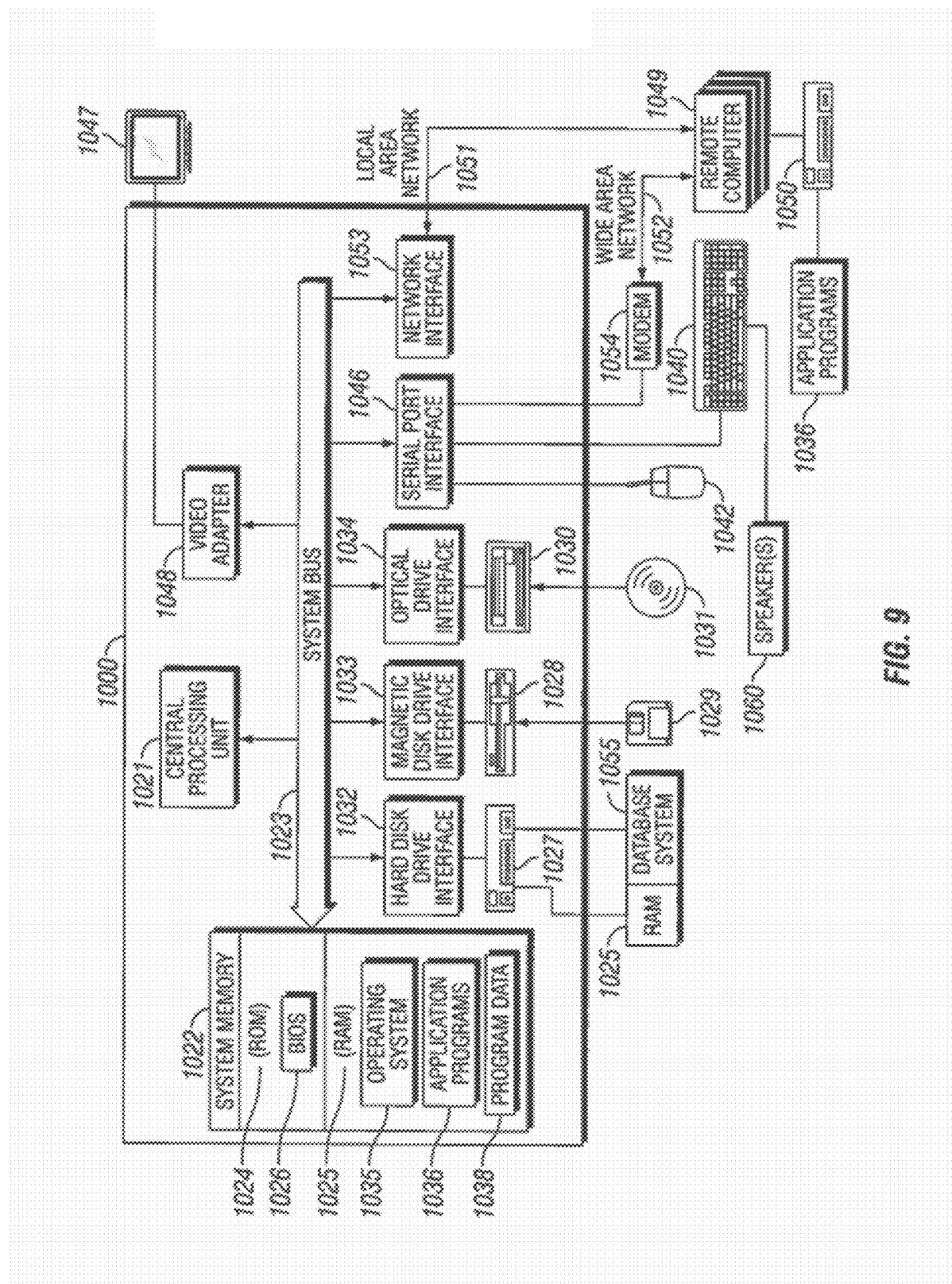
FIG. 9 is an example computer system that may be utilized in conjunction with one or more embodiments of the present invention.

Referring to FIG. 9, a computer system 1000 into which implementations of various technologies and techniques described herein may be implemented. In one implementation, computer system 1000 may be a conventional desktop or a server computer, but it should be noted that other computer system configurations may be used.

The computer system (1000) may include a central processing unit (CPU) (1021), a system memory (1022) and a system bus (1023) that couples various system components including the system memory (1022) to the CPU (1021). Although only one CPU is illustrated in FIG. 9, it should be understood that in some implementations the computer system may include more than one CPU. The system bus may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory (1022) may include a read only memory (ROM) (1024) and a random access memory (RAM) (1025). A basic input/output system (BIOS) (1026), containing the basic routines that help transfer information between elements within the computer system, such as during start-up, may be stored in the ROM (1024).

The computer system may further include a hard disk drive (1027) for reading from and writing to a hard disk, a magnetic disk drive (1028) for reading from and writing to a removable magnetic disk (1029), and an optical disk drive (1030) for reading from and writing to a removable optical disk (1031), such as a CD ROM or other optical media. The hard disk drive (1027), the magnetic disk drive (1028), and the optical disk drive (1030) may be connected to the system bus (1023) by a hard disk drive interface (1032), a magnetic disk drive interface (1033), and an optical drive interface (1034), respectively. The drives and their associated computer-readable media may provide nonvolatile storage of computer-readable instructions, data structures, program modules and other data for the computer system.

Although the computer system is described herein as having a hard disk, a removable magnetic disk (1029) and a removable optical disk (1031), it should be appreciated by those skilled in the art that the computer system may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system.

Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. Combinations of any of the above may also be included within the scope of computer readable media.

A number of program modules may be stored on the hard disk, magnetic disk, optical disk, ROM or RAM, including an operating system (1035), one or more application programs (1036), program data (1038) and a database system (1055). The operating system may be any suitable operating system that may control the operation of a networked personal or server computer, such as Windows® 7, Mac OS® X, Unix-variants (e.g., Linux® and BSD®), and the like. In one implementation, the data visualization applications referred to herein may be stored as application programs (1036) in FIG. 9.

A user may enter commands and information into the computer system through input devices such as a keyboard (1040) and pointing device (1042). Other input devices may include a microphone, joystick, game pad, satellite dish, scanner or the like. These and other input devices may be connected to the CPU through a serial port interface (1046) coupled to system bus 1023, but may be connected by other interfaces, such as a parallel port, game port or a universal serial bus (USB). A monitor (1047) or other type of display device may also be connected to system bus (1023) via an interface, such as a video adapter (1048). In addition to the monitor, the computer system may further include other peripheral output devices such as speakers (1060) and printers.

Further, the computer system may operate in a networked environment using logical connections to one or more remote computers (1049). The logical connections may be any connection that is commonplace in offices, enterprise-wide computer networks, intranets, and the Internet, such as local area network (LAN) (1051) and a wide area network (WAN) (1052). The remote computers may each include application programs (1036) similar to that as described above.

When using a LAN networking environment, the computer system may be connected to the local network (1051) through a network interface or adapter (1053). When used in a WAN networking environment, the computer system may include a modem (1054), wireless router or other means for establishing communication over a wide area network (1052), such as the Internet. The modem (1054), which may be internal or external, may be connected to the system bus (1023) via the serial port interface. In a networked environment, program modules depicted relative to the computer system, or portions thereof, may be stored in a remote memory storage device (1050). It will be appreciated that the network connections shown are exemplary and other means of establishing a communications link between the computers may be used.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies.

In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

What is claimed is:

1. A computer implemented method of facilitating oilfield operations using auditory data comprising:
   providing a computer database;
   storing auditory data to said database;
   storing oilfield data comprising a plurality of oilfield data types to said database;
   generating an auditory mapping structure wherein at least a portion of said auditory data is associated with one or more of said oilfield data types;
   providing an oilfield data visualization application for receiving oilfield data pertaining to one or more oilfield operations and for displaying said oilfield data upon a graphic user interface coupled to said computer database;
   identifying a subset of the displayed oilfield data as being an area of interest;
   identifying oilfield data types within said subset of oilfield data;
   identifying auditory data associated with said identified oilfield data types;
   emitting at least a portion of said identified auditory data; and
   wherein the oilfield data visualization application further comprises a reservoir model for simulating reservoir conditions and wherein at least a portion of the auditory data is utilized to indicate a correctness of the simulated reservoir conditions.

2. The method of claim 1, wherein said oilfield data is displayed upon said graphic user interface using a 2D, 3D, or 4D arrangement.

3. The method of claim 1, wherein said subset of displayed oilfield data is selected by a user using a computer generated selection tool controllable by an input device coupled to the graphic user interface.

4. The method of claim 3, further comprising the additional step of:
providing a settings interface through which the user may adjust pitch, frequency, or timbre settings for said auditory data.

5. The method of claim 3, wherein said computer generated selection tool further comprises a substantially rectangular or substantially cubic graphic.

6. The method of claim 3, wherein said selection tool further comprises one or more interactive features.

7. The method of claim 1, wherein said auditory data further comprises a plurality of sounds.

8. A non-transitory computer-readable storage medium for facilitating oilfield operations using auditory data comprising instructions which, when executed, cause a computing device to:
store auditory data to a computer database;
store oilfield data comprising a plurality of oilfield data types to said database;
generate an auditory mapping structure wherein at least a portion of said auditory data is associated with one or more of said oilfield data types;
receive oilfield data pertaining to one or more oilfield operations and display said oilfield data upon a graphic user interface coupled to said computer database using an oilfield data visualization application;
identify a subset of the displayed oilfield data as being an area of interest;
identify oilfield data types within said subset of oilfield data;
identify auditory data associated with said identified oilfield data types;
emit at least a portion of said identified auditory data; and
wherein the oilfield data visualization application further comprises a reservoir model for simulating reservoir conditions and wherein at least a portion of the auditory data is utilized to indicate a correctness of the simulated reservoir conditions.

9. The computer-readable storage medium of claim 8, wherein said oilfield data is displayed upon said graphic user interface using a 2D, 3D, or 4D arrangement.

10. The computer-readable storage medium of claim 8, wherein said subset of displayed oilfield data is selected by a user using a computer generated selection tool controllable by an input device coupled to the graphic user interface.

11. The computer-readable storage medium of claim 10, wherein the instructions, when executed, cause the computing device to:
adjust pitch, frequency, or timbre settings for at least a portion of said auditory data.

12. The computer-readable storage medium of claim 10, wherein said computer generated selection tool further comprises a substantially rectangular or substantially cubic graphic.

13. The computer-readable storage medium of claim 8, wherein said auditory data further comprises a plurality of sounds.

14. An oilfield analysis system comprising:
a processor configured to:
store auditory data to a computer database;
store oilfield data comprising a plurality of oilfield data types to said database;
generate an auditory mapping structure wherein at least a portion of said auditory data is associated with one or more of said oilfield data types;
receive oilfield data pertaining to one or more oilfield operations and display said oilfield data upon a graphic user interface coupled to said computer database using an oilfield data visualization application;
identify a subset of the displayed oilfield data as being an area of interest;
identify oilfield data types within said subset of oilfield data;
identify auditory data associated with said identified oilfield data types;
emit at least a portion of said identified auditory data using one or more speakers; and
wherein the oilfield data visualization application further comprises a reservoir model for simulating reservoir conditions and wherein at least a portion of the auditory data is utilized to indicate a correctness of the simulated reservoir conditions.

15. The oilfield analysis system of claim 14, wherein said oilfield data is displayed upon said graphic user interface using a 2D, 3D, or 4D arrangement.

16. The oilfield analysis system of claim 14, wherein said subset of displayed oilfield data is selected by a user using a computer generated selection tool controllable by an input device coupled to the graphic user interface.

17. The oilfield analysis system of claim 16, wherein the processor is configured to:
adjust pitch, frequency, or timbre settings for at least a portion of said auditory data.

18. The oilfield analysis system of claim 16, wherein said computer generated selection tool further comprises a substantially rectangular or substantially cubic graphic.

19. The oilfield analysis system of claim 14, wherein said auditory data further comprises a plurality of sounds.

20. The oilfield analysis system of claim 14, wherein said selection tool further comprises one or more interactive features.

* * * * *